(No Model.) 2 Sheets—Sheet 1.
E. KEITH.
GRAIN SCOURER AND SEPARATOR.

No. 558,182. Patented Apr. 14, 1896.

Witnesses:
Theo. L. Popp
Chas. F. Burkhardt

Elgin Keith Inventor
By Wilhelm & Bonner
Attorneys.

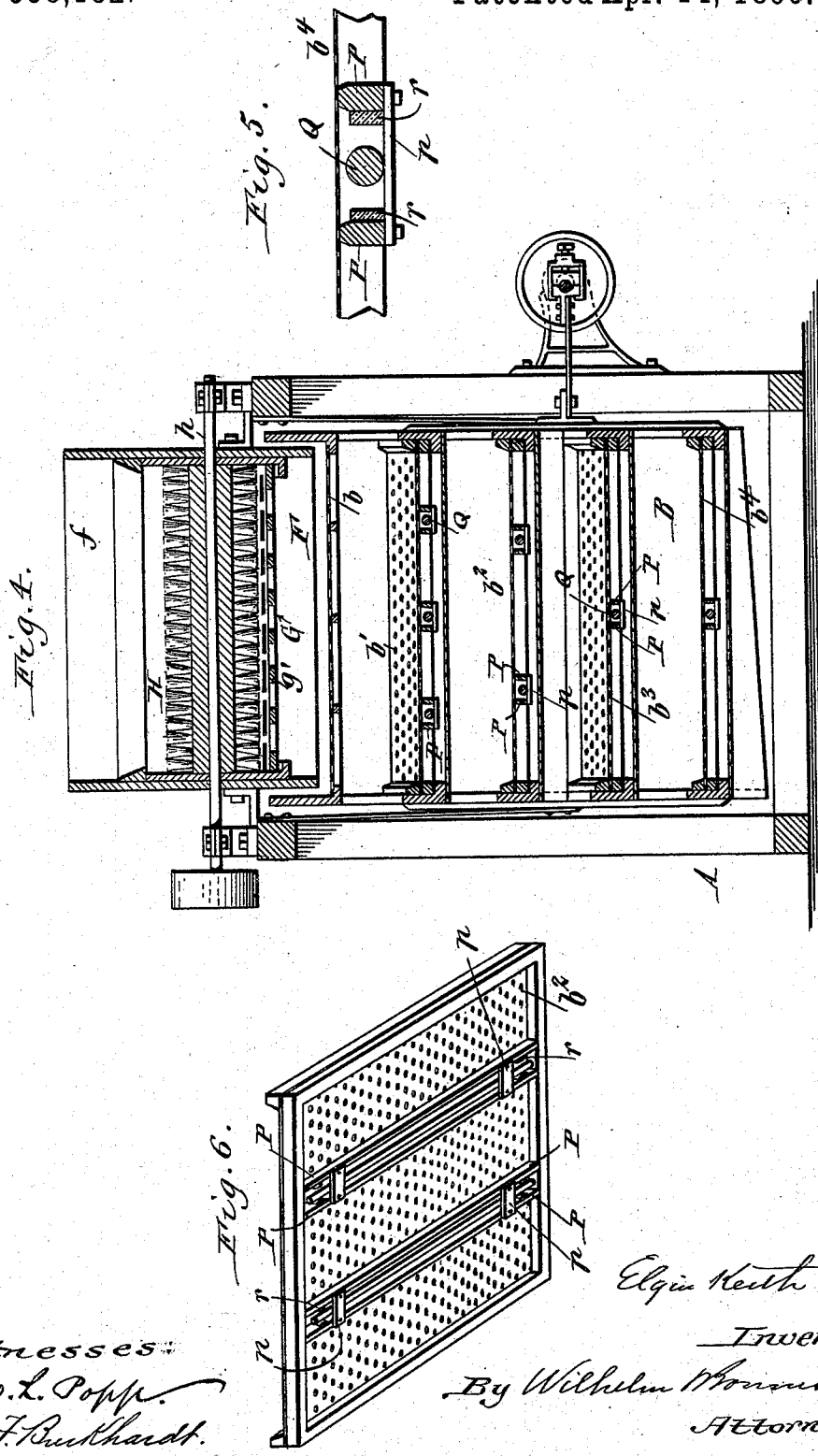

UNITED STATES PATENT OFFICE.

ELGIN KEITH, OF SILVER CREEK, NEW YORK, ASSIGNOR TO THE S. HOWES COMPANY, OF SAME PLACE.

GRAIN SCOURER AND SEPARATOR.

SPECIFICATION forming part of Letters Patent No. 558,182, dated April 14, 1896.

Application filed March 5, 1895. Serial No. 540,574. (No model.)

*To all whom it may concern:*

Be it known that I, ELGIN KEITH, a citizen of the United States, residing at Silver Creek, in the county of Chautauqua and State of New York, have invented new and useful Improvements in Grain Scourers and Separators, of which the following is a specification.

This invention relates to a grain scourer and separator which is more particularly designed for cleaning and separating beans and coffee, and has the objects to improve the scouring mechanism, so as to enable various sizes of grains or seeds to be gently but thoroughly scoured, and to provide a cleaning mechanism which will effectually prevent the screens from becoming clogged by grains or seeds lodging in the openings of the perforated plates with which the screen-frames are covered.

Figure 1:
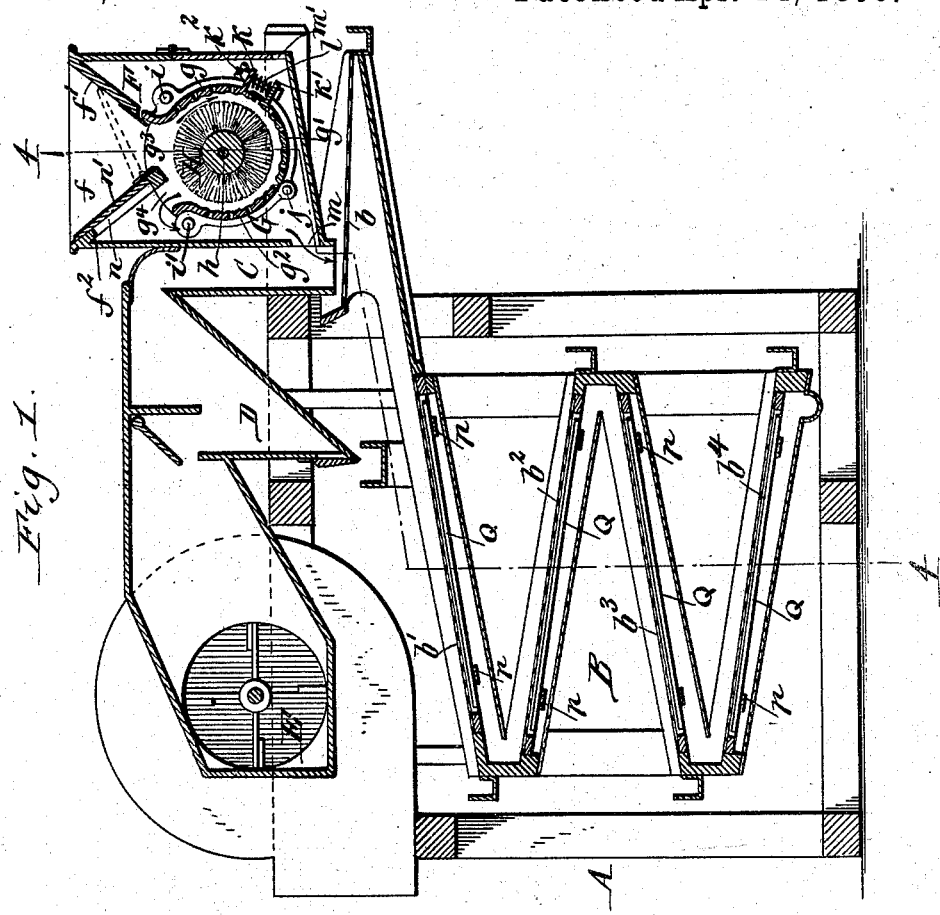
Figure 2:
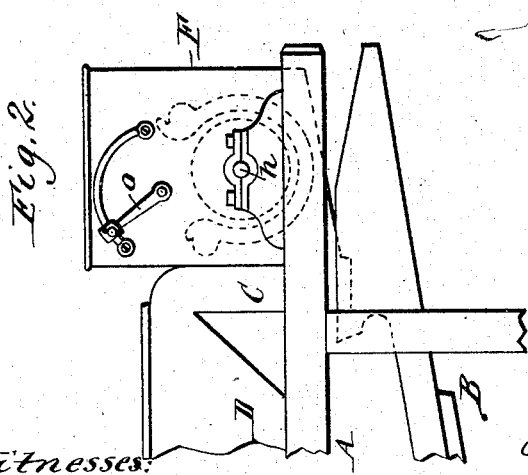
Figure 3:
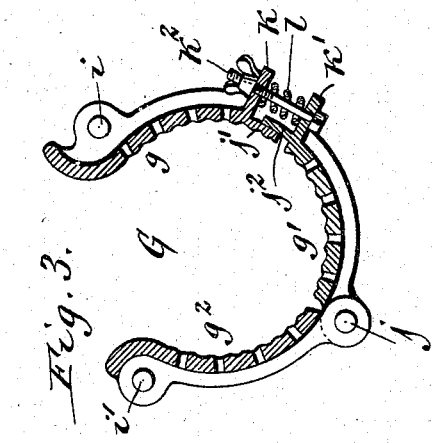

In the accompanying drawings, consisting of two sheets, Figure 1 is a longitudinal sectional elevation of a combined scourer and separator embodying my improvements. Fig. 2 is a fragmentary side elevation of the feed end of the machine. Fig. 3 is a cross-section, on an enlarged scale, of the adjustable scouring-sections. Fig. 4 is a vertical cross-section in line 4 4, Fig. 1. Fig. 5 is a fragmentary cross-section, on an enlarged scale, of one of the screens and its cleaner. Fig. 6 is a perspective view of the under side of one of the screens provided with my improved cleaning device.

Like letters of reference refer to like parts in the several figures.

A represents the main frame of the separator supporting a shaking-shoe B, which is provided with a zigzag series of inclined screens $b\ b'\ b^2\ b^3\ b^4$, a vertical wind-trunk C, opening with its lower end over the uppermost screen $b$, a chess-hopper D, connected with the upper end of the wind-trunk, and a fan E, connected with the chess-hopper, all of which parts may be of any well-known and suitable construction.

F represents the casing of the scouring mechanism arranged in front of the wind-trunk and provided in its upper portion with a feed-hopper $f$.

G represents a scouring-concave arranged horizontally in the casing below the feed-hopper and transversely of the machine, so that the grain passes from the feed-hopper into the scouring-concave.

H represents a rotary scouring-cylinder, preferably a cylindrical brush, arranged in the scouring-concave and extending the full length thereof. This brush is rotated in such direction that it moves downwardly with its front side, as indicated by the arrows in Fig. 1, and is mounted on a horizontal shaft $h$, which extends through the side walls of the casing and is journaled in bearings on the main frame. The scouring-concave is composed of a number of movable sections which are capable of adjustment toward and from the brush for regulating the scouring action upon the grain as it passes between the concave and the brush. As shown in the drawings, the scouring-concave consists of a front section $g$, a bottom section $g'$, and a rear section $g^2$. The front section is arranged with its upper end close to the lower end of the front wall $f'$ of the feed-hopper and is attached near its upper end to the end walls of the casing by pivots $i$. The rear section of the concave is similarly attached at its upper end to the end walls of the casing by pivots $i'$. The rear end of the bottom section is connected with the lower end of the rear section by hinges $j$, and its front end is connected with the lower end of the front section by an adjusting device which permits the front and bottom sections to be drawn toward each other or spread apart, thereby adjusting the concave toward the brush or from the same. For this purpose the adjoining edges of the front and bottom sections are constructed with overlapping portions $j'$ $j^2$ and with lugs or ears K K', through which passes an adjusting screw-bolt $K^2$. Upon tightening this bolt the sections are turned upon their pivots and drawn closer to the scouring-brush, thereby reducing the space between the inner side of the concave and the brush, whereby the scouring action upon the grain is increased.

Upon loosening the adjusting-bolt the sections are spread apart, thereby increasing the space between the inner side of the drum and the brush and reducing the scouring action upon the grain. This spreading of the sections is facilitated by a spring $l$, which surrounds the adjusting-bolt and bears with its ends against the lugs K K'. The cylindrical form of the brush assists in insuring a gentle and uniform scouring action.

The lower end of the rear wall $f^2$ of the feed-hopper is arranged about midway between the upper ends of the front and rear sections of the concave, thereby forming an inlet $g^3$ for the concave between the front section of the concave and the rear wall of the hopper and an outlet $g^4$ for the concave between said rear wall and the rear section. The grain entering the scouring-concave is carried by the brush downwardly between the latter and the front portion of the concave and upwardly between the brush and the rear portion of the concave and is discharged through the outlet above the upper end of the rear section and then drops upon the bottom of the casing. In order to increase the scouring action upon the grain, the inner sides of the scouring-sections are preferably corrugated, as shown. The fine particles of impurities which are removed from the grain pass through perforations formed in the scouring-sections and drop on the inclined bottom of the casing. An outlet-opening $m$ is formed in the lower portion of the rear wall of the casing, through which the material, consisting of grain and impurities, passes from the bottom of the casing into the wind-trunk, where it encounters the ascending air-current, whereby the light impurities are separated and carried off to the fan, while the heavier material drops through the wind-trunk upon the uppermost screen $b$. In order to prevent the formation of a dead-air space in the lower portion of the space surrounding the scouring-concave, an opening $m'$ is formed in the lower portion of the front wall of the casing, through which an air-current is drawn by the fan across the under side of the scouring-concave, thereby preventing an accumulation of material underneath the same.

When it is not desired to scour the grain, but simply to separate the same from impurities and into different grades, the grain is delivered directly into the separator instead of first passing through the scourer. For this purpose the rear wall $f^2$ of the feed-hopper is provided with an opening or by-pass $n$, which can be opened or closed by a valve $n'$, which is pivoted with its lower end to the lower portion of said rear wall. When it is desired to scour the grain, the valve $n'$ is shifted so as to rest upon the rear wall and close the by-pass, as represented in full lines in Fig. 1; but when it is not desired to scour the grain the valve is swung forwardly, so that it bears with its free end against the front wall of the feed-hopper, as represented in dotted lines in the same figure, thereby covering the inlet-opening of the scouring-concave and opening the by-pass, so that the grain now passes from the feed-hopper through the by-pass and behind the scouring-drum to the separator without passing through the scouring-concave. The pivot of the valve projects outside of the casing and is provided with a shifting-arm $o$, whereby the valve is operated.

It is obvious that this scouring mechanism can be employed without a subsequent separator; but for the purpose of cleaning and separating beans, coffee, and similar grains or seeds it is preferably combined with a subsequent separator, as herein shown and described.

The large impurities—such as straw, sticks, &c.—which are deposited on the uppermost or scalping screen $b$ with the grain are separated therefrom and discharged over the tail of this screen, while the remainder passes through the comparatively large perforations of this screen and is carried to the grading-screen $b'$. The latter is of finer mesh than the screen $b$, whereby the larger particles in the remaining material are separated and discharged over the tail of this screen, while the smaller particles pass through the meshes of said screen. The remaining material is treated successively in like manner by the following grading-screens $b^2$, $b^3$, and $b^4$, each succeeding screen being of finer mesh, thereby grading the material as to size in a well-known manner.

As the grain passes over the grading-screens $b'$, $b^2$, $b^3$, and $b^4$ some of the kernels, which are about of the same size as the perforations of the screen over which they pass, are caught in these perforations and clog the screen. In order to dislodge these kernels and keep the screens in an operative condition, each of the grading-screens is provided with a cleaning device, which is constructed as follows:

P P represent two parallel impact-bars arranged underneath the screen transversely with reference to the line of vibration of the screen and secured with their ends to the screen-frame. These bars are separated, so as to form an intervening space, and are connected on their under sides at suitable points by transverse cleats $p$.

Q represents a loose knocker rod or roller, of metal or other heavy material, which is arranged lengthwise between the impact-bars and rests upon the cleats $p$. The knocker-rod is round in cross-section, and upon shaking the screen the rod rolls back and forth on the cleats and strikes the impact-bars with considerable force, thereby jarring the screen. This jarring of the screen is distinct from the ordinary shaking movement and causes the screen to toss the kernels on the same upwardly, whereby the kernels which have been caught in the perforations or meshes are dislodged. The knocker-rod extends nearly the full length of the screen, so that the blow of the rod is distributed uniformly over the entire length of the screen. In order to lessen the noise produced by the impact of the roller against the bars, the latter are preferably faced on their inner sides with blocks $r$, of rubber or similar material, which receive the impact of the roller. Each of the screens is provided with one or more of the cleaning devices according to the load upon each particular screen. As shown in the drawings, the upper screen $b'$ is provided with three of these cleaners, the next lower screen $b^2$ with two cleaners, and the remaining screens $b^3$ and $b^4$ with one cleaner each.

I claim as my invention—

1. The combination with the scouring cylinder or brush, of a scouring-concave composed of depending upper sections which are hung at their upper ends on fixed pivots arranged parallel with the scouring cylinder or brush and a lower section hinged at one end to the lower end of one of the sections and connected at its other end to the upper section by an adjusting-bolt and provided with a spring which tends to separate the two sections which are connected by the bolt, substantially as set forth.

2. The combination with a shaking-screen provided with impact-bars below the screen-surface and with supports between the impact-bars, of a cylindrical knocker resting on said supports between said impact-bars and adapted to strike each bar substantially along its entire face in rolling back and forth between said bars, substantially as set forth.

Witness my hand this 23d day of February, 1895.

ELGIN KEITH.

Witnesses:
JNO. J. BONNER,
THEO. L. POPP.